Sept. 12, 1967      F. KALWAITES      3,340,584
APPARATUS FOR CROSS-LAYING FIBROUS MATERIAL
Filed June 17, 1965      3 Sheets-Sheet 2
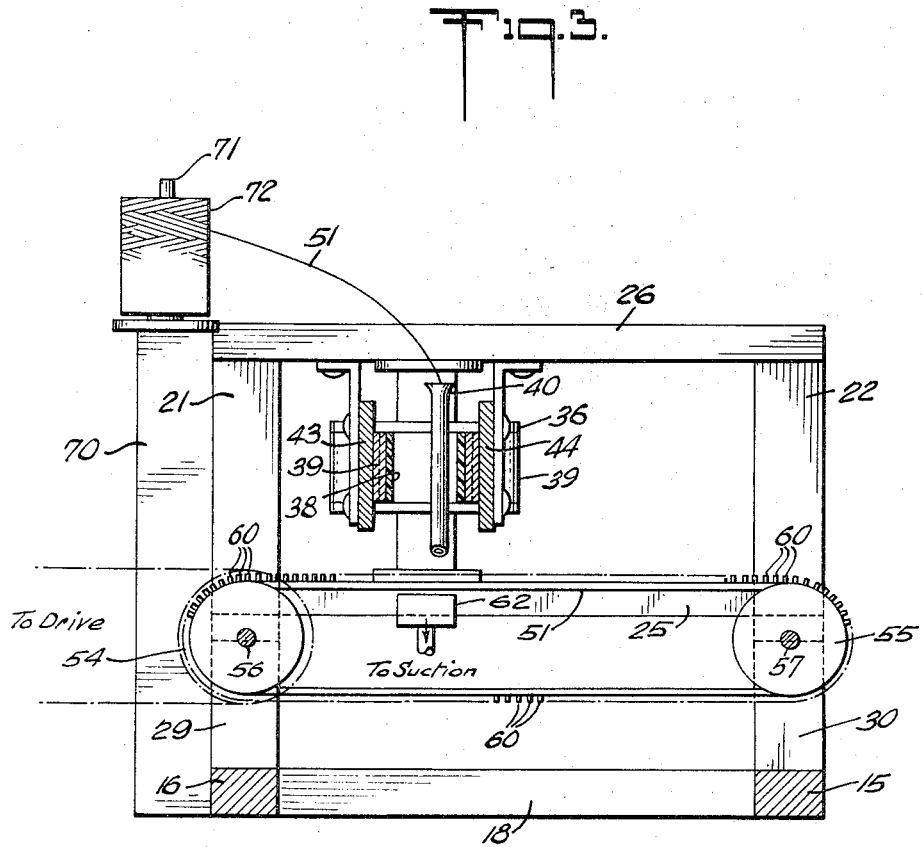
INVENTOR.
FRANK KALWAITES
BY
ATTORNEY

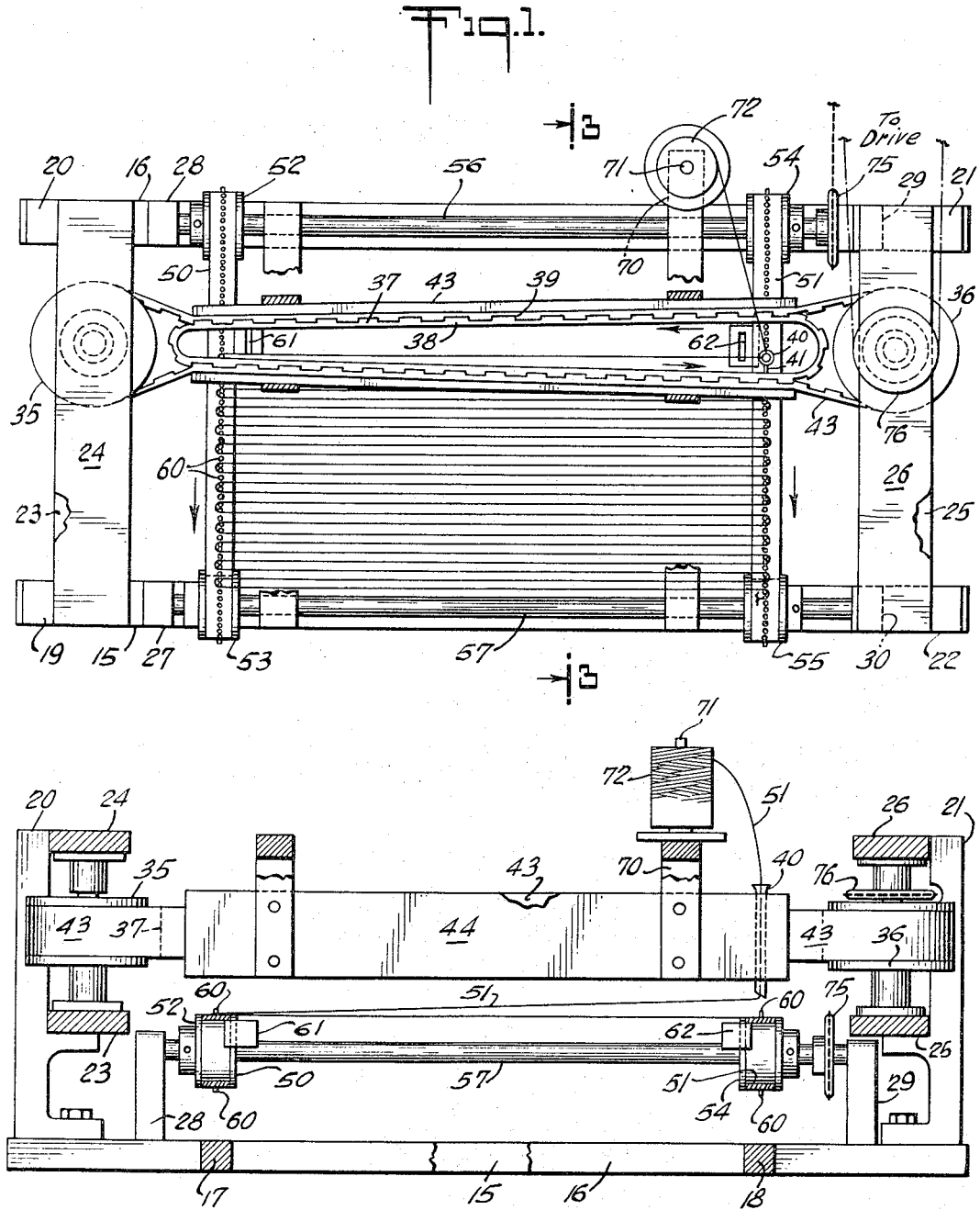

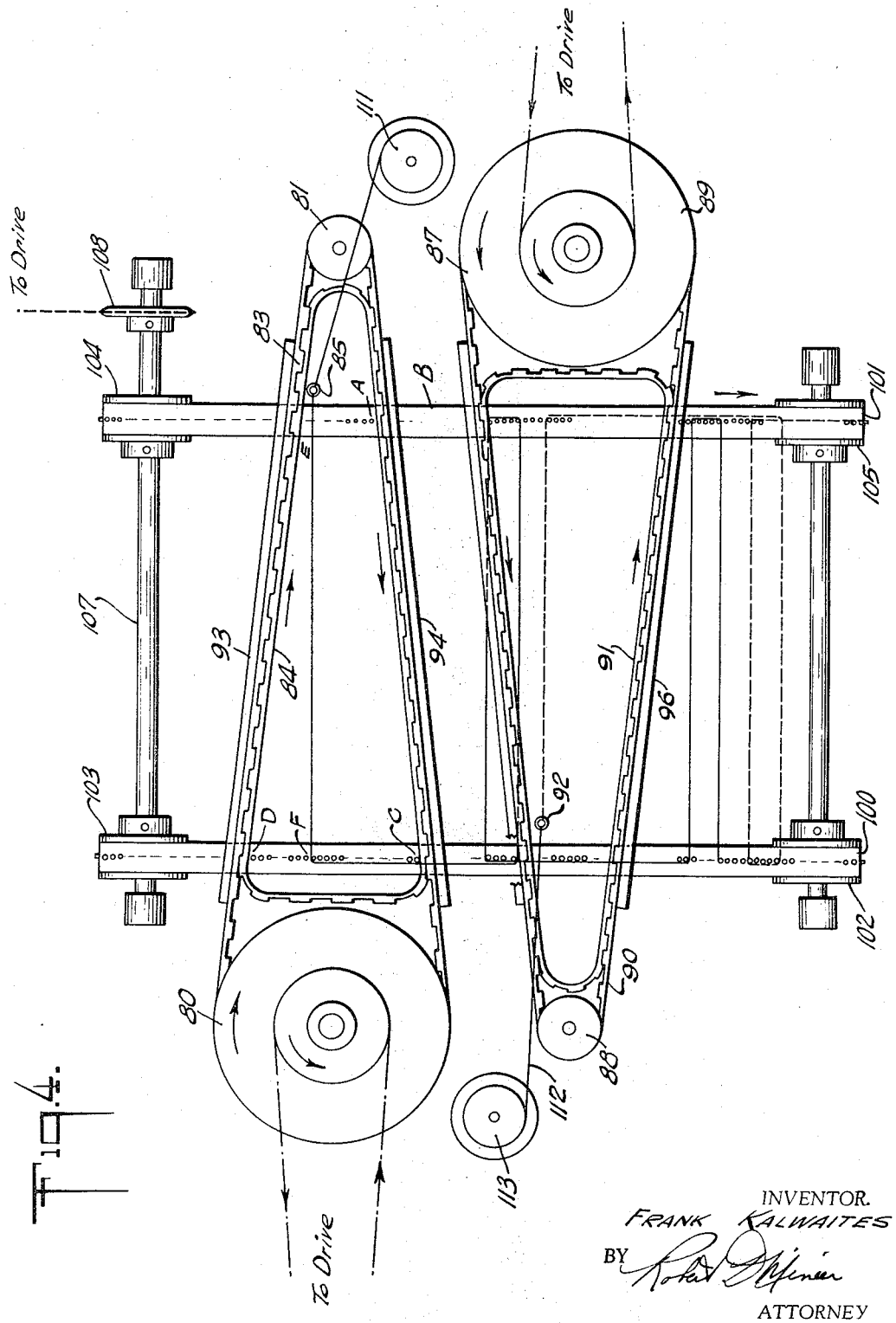

United States Patent Office 3,340,584
Patented Sept. 12, 1967

3,340,584
APPARATUS FOR CROSS-LAYING
FIBROUS MATERIAL
Frank Kalwaites, Somerville, N.J., assignor to Johnson & Johnson, a corporation of New Jersey
Filed June 17, 1965, Ser. No. 464,762
11 Claims. (Cl. 28—1)

This invention relates to apparatus for cross-laying fibrous material and more particularly to apparatus for cross-laying threads at any angle up to and including 90 degrees to a moving surface.

Products such as paper and nonwoven fabrics have a long and a cross direction. As these products are made on a continuous basis, the long direction is the machine direction, i.e. the direction in which the product is made. The cross direction is transverse to the machine direction, i.e. 90 degrees to the machine direction or what would be termed the width of the product. The majority of these products have good strength in the long direction but because of the nature of the manufacturing processes used their strength in the cross direction is poor. One way of improving this strength in the cross direction is to laminate the product with cross-laid materials such as a layer of threads with the threads placed at 90 degrees to the machine direction of the product.

Heretofore there have been numerous methods and apparatus for cross-laying fibrous material such as strands, threads, webs, etc. However, most of these have their shortcomings in that the simple and uncomplicated machines do not lay the fibrous material at substantially 90 degrees but are limited to various other angle lays. Those machines which have been developed for laying fibrous materials at substantially 90 degrees are either quite complicated or must be operated at relatively low speeds and hence have considerable economic drawbacks.

I have developed a relatively simple apparatus for cross-laying fibrous materials such as webs, threads, or strands at substantially 90 degrees or other smaller angles to a moving surface at relatively high rates of speed. If desired, a plurality of my apparatus may be placed in series to lay the fibrous material close together and at even faster rates of speed.

In accordance with the present invention, my cross-laying apparatus comprises a pair of endless belts of different lengths. The shorter belt of the pair is nested inside the longer belt. The longer belt is driven by any suitable driving mechanism and in turn drives the shorter belt nested therein. The width of the belts are positioned vertically and the movement of the belt is horizontal. Feed means such as a yarn guide is attached to the shorter belt. A pair of guide means are positioned in contact with the straight flights of the longer belt to control the path of the belts in the horizontal plane and the feed means attached to the shorter belt. Positioned beneath the endless belts and at an angle to the belts is a conveying means. Preferably this conveying means is positioned at an angle of approximately 90 degrees to the pair of endless belts. The conveying means is substantially as wide as the length of the guide means and at each edge of the conveying means are holding means such as pins or hooks. The fibrous material to be cross-laid is fed to the feed means attached to the shorter belt. As the shorter belt makes a pass along one of its straight flights, the feed means lays down the fibrous material. The belt and feed means then make a turn to pass on their return flight and again lay down the fibrous material. As the feed means makes its turn, the fibrous material is wrapped about the holding means or pin on one edge of the conveying means and held in that position as the fibrous material is returned to the other edge of the conveying means and held in that position and so on. By controlling the angle between the pair of guide means, that is by controlling the relative angle between the belt flights and synchronizing this angle with the relative speeds between the pair of endless belts and the conveying means positioned beneath said pair of belts, the fibrous material may be laid at 90 degrees or at substantially any angle from 45 degrees to 90 degrees. Furthermore, the angle between the belt flights as well as the relative speeds will control the spacing between yarns. The greater the angle between belt flights, the faster the speed of the conveying means may be and still obtain a 90-degree lay. However, when the angle between belt flights is increased, a pair of yarns will be further spaced from adjacent pairs than they are from each other; that is, the distance between the first and second strands, third and fourth strands, the fifth and sixth strands will be substantially the same. Also the distance between the second and third strands, the fourth and fifth strands, etc., will be the same but the distance between the first and second strands and the distance between the second and third strands will be different. This may be compensated for by placing a plurality of the mechanisms described above in alignment, i.e. placing a flight of the belt of one mechanism adjacent and coextensive with the flight of a belt of an adjacent mechanism so that the second pair of endless belts lays down its strands between the two strands laid down by the first mechanism as will be hereinafter described.

The invention will be more fully described in conjunction with the accompanying drawings wherein:

FIGURE 1 is a top view of apparatus for cross-laying fibrous materials in accordance with the present invention;

FIGURE 2 is a cross-sectional view taken along line 2—2 of FIGURE 1;

FIGURE 3 is a cross-sectional view taken along line 3—3 of FIGURE 1; and

FIGURE 4 is a top view of another mechanism for cross-laying fibrous materials in accordance with the present invention.

Referring to FIGURES 1, 2, and 3, a suitable framework is indicated comprising two main bottom frames 15 and 16 connected by cross frames 17 and 18. Mounted on the ends of each of the main bottom frames are corner posts 19, 20, 21, and 22. Corner posts 19 and 20 at the edges of the framework are connected by the cross side frames 23 and 24; and corner posts 21 and 22 are connected by the cross side frames 25 and 26. Mounted within the confines of this framework are four upright posts 27, 28, 29, and 30.

Mounted in a horizontal manner between the cross-side braces between corner posts are a pair of pulleys 35 and 36. The pulleys are mounted on vertical shafts 31 and 32 mounted for rotation in bearings mounted in the cross-side braces. Extending about these pulleys is an endless belt 37 and nested within the belt is a shorter belt 38. The belts are in intimate contact by virtue of the notches 39 which intermesh between belts. As may be seen in FIGURE 1 the shorter belt may be considered to be a floating belt. Mounted on the inside of this shorter belt is a guide tube 40. The guide tube is positioned by brace 41, a specified distance from the surface of the shorter belt.

The straight flights of the longer belt contact for almost their entire distance a pair of guide bars 43 and 44. The guide bars are not quite parallel but are spaced at a slight angle to each other and control the path of the guide tube. By the correct spacing of the guide tube from the surface of the shorter belt and the correct angle between guide bars, the lay of the yarn by the guide tube may either be in a perfect loop or if desired may be in a figure-8 loop. Furthermore, depending on the spacing and angle correlated with the relative speed between the longer belt and the mechanism onto which the yarn is laid will control the angle at which the yarn is laid and the spacing between yarns.

The longer belt moves in the direction of the arrow shown and in turn the shorter belt moves in the same direction therewith.

Mounted below the pair of endless belts and from the four upright braces are a pair of conveyors 50 and 51. The conveyor 50 is mounted on the pulleys 52 and 53 and conveyor 51 is mounted on the pulleys 54 and 55. Pulleys 52 and 54 are mounted on axle 56 which is mounted for rotation in bearings mounted in the upright braces 28 and 29, and pulleys 53 and 55 are mounted on the axle 57 mounted for rotation in the bearings mounted on the upright braces 27 and 30. Both conveyors move together at the same rate of speed in the direction of the arrows shown. Mounted on the surface of both conveyors are pins 60. These pins are for holding the fibrous material as it is laid by the pair of endless conveyors. It is preferred that the pins be as closely spaced as possible to improve the gripping of the yarns in a uniform manner and also prevent yarns from missing a pin or slipping from a pin. Also mounted below the pair of conveyors at the edges thereof and adjacent the endless belts are suction mechanisms 61 and 62 for controlling the fibrous material as it is laid and wrapped about the pins.

Mounted from the back bottom main frame piece is an upright brace 70 and mounted on this upright brace is a spindle 71 for holding a creel 72 of material to be fed to the cross-laying mechanism.

In operation, a creel of yarn to be cross-laid is placed on the spindle and fed through the guide tube down to a pin on one of the conveyors. The conveyors are driven by the drive mechanism 75 a portion of which is shown and the pair of belts are driven by the drive mechanism 76 a portion of which is shown. The conveyors move in the direction shown and at the same time the belts with the guide tube attached thereto is moved in the direction shown and the yarn is fed in a looped configuration by the guide tube. The yarn is wrapped about the pin on one conveyor and conveyed by the pair of belts to the other conveyor and there wrapped about a pin on the other conveyor. The yarn is then conveyed back to the initial edge of the first conveyor and wrapped about another pin and so on. The guide tube travels at a slight angle across the width of the conveyors and in so doing, provided its speed is correlated with the speed of the conveyors, will lay the yarn at any desired angle. Again by being spaced from the inside surface of the belt, the yarn again travels at an angle in its return flight and if correlated correctly will lay the yarn at that same angle on its return flight. The yarn forms a loop at the curved end of the shorter belt which is controlled by the suction mechanism and pulled taut as the guide tube passes to the other edge of the conveyor. Upon being pulled taut it is engaged by the pins and held in that place, the cross-laid yarns are conveyed forwardly as the conveyors move in the direction shown, and when they reach the portion of the conveyors which pass about their respective pulleys, the pins open up and lay the yarn upon any desired material such as a fibrous web, paper, etc., which is fed in the same direction the yarns are moving past the leading edge of the conveyors as they pass about the pulleys.

It is important that the guide means 43 and 44 extend beyond the edges of the conveyors 50 and 51 so that the yarn travel is fully controlled over its entire laying distance.

If desired, the conveyors 50 and 51 may be slightly canted outwardly as they pass beneath the pair of belts to insure better holding action by the pins. The conveyors may then be canted back inwardly as they pass about the pulleys 53 and 55 to aid in the removal of the yarns from the pins.

In FIGURE 4 there is shown a modified apparatus of the present invention comprising two pair of belts. The first pair 80 comprises a small pulley 81 and a large pulley 82, passing about these pulleys is the longer belt 83, and nested inside this belt is the shorter belt 84. In this manner the shorter belt passes in an angular path in the direction of the arrow shown. Mounted on the inside of this shorter belt is the guide tube 85. Mounted adjacent this first pair of belts is a second pair of belts 87. This second set also comprises a smaller pulley 88 and a larger pulley 89. Passing about the pulleys is the longer belt 90 with the shorter belt 91 nested inside thereof. Mounted on the inside of the shorter belt is the feed guide tube 92. Again the shorter belt passes in an angular movement but opposite that movement of the other pair of belts and in the direction of the arrow shown. Guide plates 93 and 94 control the paths of the long flight of the first set of belts and guide plates 95 and 96 control the path of the long flights of the second set of belts. Mounted beneath the two pair of belts are a pair of conveyors 100 and 101 which move together in the direction of the arrow shown. The conveyors are mounted on pulleys 102, 103, 104, and 105 mounted on the axles 106 and 107 as shown. These pulleys with the conveyors are driven by the drive 108 a portion of which is shown.

In operation yarn 110 is fed from the creel 111 to the guide tube 85 of the first pair of belts. The yarn is laid on the conveyor 101 about a pin thereof at A. As the conveyor 101 moves from the point A to the point B, the feed guide tube passes from A to point C and lays the yarn about the pin on conveyor 100 so that the yarn extends from point B to C. The guide tube then passes on the shorter belt to point D, wraps the yarn about the pin at that point and while moving to point E the yarn moves from point D to point F and a second yarn is laid between points E and F. This means that two yarns will be laid at a specified spacing apart, after a short distance two more yarns will be laid by this mechanism a short distance apart. The second set of belts is synchronized to lay yarns between the two sets laid by the first set of belts. If desired, a plurality of the pairs of belts may be synchronized to get any desired spacing between yarns.

The second set of belts simultaneously takes a yarn 112 from the creel 113, guides it to the guide tube 92 and lays a pair of yarns between the yarns laid by the first pair of belts.

The invention will be further illustrated in greater detail by the following specific examples. It should be understood however that although these examples may describe in particular detail some of the more specific features for the invention, they are given primarily for purposes of illustration and the invention in its broader aspects is not to be construed as limited thereto.

EXAMPLE I

A 30's cotton yarn is cross-laid on a spacing of 6 yarns per linear inch by the apparatus depicted in FIGURES 1, 2, and 3. The guide bars 43 and 44 are positioned at an angle to each other with them being spaced approximately ½ inch apart at one edge of the bars and $15/16$ inch apart at the other edge. The guide tube is spaced $7/16$ inch from the inner surface of the inner belt and passes in a figure-8 type loop. The inner belt is driven at a surface linear speed of 585 feet per minute by the longer or outer belt. The pair of conveyors 50 and 51, positioned as shown, are driven in the direction of the arrow as shown at a linear surface speed of 5 feet per minute. The cotton yarn fed through the guide tube is laid down about the pins of the conveyors at a spacing of 6 yarns per linear inch and at a rate of 5 feet per minute. A 200 grain weight nonwoven fabric is fed past pulleys 53 and 55 and picks up the yarns as they pass about the circumference of these pulleys and these yarns are laid in a cross-laid manner upon the nonwoven fabric. A second nonwoven fabric is placed on top of these yarns and the entire laminate bonded together to produce a cross-reinforced nonwoven fabric.

EXAMPLE II

A pair of endless belts as depicted in FIGURE 4 is provided. The spacing at one edge of the guide plates 93 and 94 is 2¾ inches and at the opposite edge is 7 inches with the feed tube spaced about ¼ inch from the inside surface of the inner belt. The second set of endless belts has the same spacing between guide plates 95 and 96 with the shorter spacing being aligned with the longer spacing of the first set and the longer spacing of the second set being in line with the shorter spacing of the first set. Both pair of belts are moved in the direction of the arrows shown at surface linear speeds of 3000 feet per minute. Positioned beneath the two sets are the endless conveyors 100 and 101 which move in the direction of the arrow shown at a surface linear speed of about 80 feet per minute. A rayon yarn is fed through the guide tube 85 and laid down upon the endless conveyors at a spacing between yarns of about ¼ inch and a spacing between every two yarns of about ½ inch. Similar rayon yarn is laid down by the guide tube 92 at a spacing between yarns of about ¼ inch and a spacing between every two yarns of about ½ inch with the mechanism synchronized so that two yarns of the first set are laid between every two yarns of the second set so that in the final product you have approximately 4 yarns per inch on equidistant spacings. With these yarns laid at approximately 90 degrees, a beam of warp yarns having 4 yarns per inch of width is let off a standard warp beamer. The yarns have an adhesive coating and are passed onto the cross-yarns as the cross-yarns pass around the pulleys 102 and 105 and are adhered thereto. The yarns are then removed from the endless conveyors in the form of a 4 by 4 scrim.

Although several specific examples of the inventive concept have been described, the same should not be construed as limited thereby nor to the specific features mentioned therein, but to include various other equivalent features as set forth in the claims appended hereto. It is understood that any suitable changes, modifications and variations may be made without departing from the spirit and scope of the invention.

Although no motors, pulleys, belts, gears or like mechanical means have been completely illustrated or described in the specification for driving the various endless belts, endless conveyors and pulleys in their desired or required speeds or with the rotation indicated by their direct arrows, it is to be appreciated that such elements have been omitted to keep the drawings and the description succinct and to avoid the introduction of matter which are well-known expedients in the art. The mechanical driving means which are used are conventional and merely involve the application of well-known mechanical driving principles.

What is claimed is:

1. Apparatus for cross-laying fibrous materials comprising: a pair of endless belts of different lengths arranged so that the shorter belt is nested inside the longer belt, means for driving the longer belt which in turn drives the shorter belt, feed means attached to the shorter belt, a pair of guide means positioned in contact with the straight flights of said longer belt to control the path of said belts and the feed means attached thereto, conveying means positioned beneath and at an angle to said pair of endless belts, said conveying means being substantially as wide as the length of said guide means and holding means positioned at the edges of said conveying means whereby fibrous material from said feed means is held by said holding means at the edge of said conveying means and is passed to the other edge of said conveying means and held by said holding means at said edge as the shorter belt passes along a straight flight of its path.

2. Apparatus for cross-laying fibrous materials comprising: a pair of endless belts of different lengths arranged so that the shorter belt is nested inside the longer belt, means for driving the longer belt which in turn drives the shorter belt, feed means attached to the shorter belt, a pair of guide means positioned in contact with the straight flights of said longer belt to control the path of said belts and the feed means attached thereto, conveying means positioned beneath and at an angle of approximately 90 degrees to said pair of endless belts, said conveying means being substantially as wide as the length of said guide means and holding means positioned at the edges of said conveying means whereby fibrous material from said feed means is held by said holding means at the edge of said conveying means and is passed to the other edge of said conveying means and held by said holding means at said edge as the shorter belt passes along a straight flight of its path.

3. Apparatus for cross-laying fibrous materials comprising: a pair of endless belts of different lengths arranged so that the shorter belt is nested inside the longer belt, means for driving the longer belt which in turn drives the shorter belt, feed means attached to the shorter belt, a pair of guide means positioned in contact with the straight flights of said longer belt and at an angle to each other to control the path of said belts and the feed means attached thereto, conveying means positioned beneath and at an angle to said pair of endless belts, said conveying means being substantially as wide as the length of said guide means and holding means positioned at the edges of said conveying means whereby fibrous material from said feed means is held by said holding means at the edge of said conveying means and is passed to the other edge of said conveying means and held by said holding means at said edge as the shorter belt passes along a straight flight of its path.

4. Apparatus for cross-laying fibrous materials comprising: a pair of endless belts of different lengths arranged so that the shorter belt is nested inside the longer belt, means for driving the longer belt which in turn drives the shorter belt, feed means attached to the shorter belt, a pair of guide means positioned in contact with the straight flights of said longer belt and at an angle to each other to control the path of said belts and the feed means attached thereto, conveying means positioned beneath and at an angle of approximately 90 degrees to said pair of endless belts, said conveying means being substantially as wide as the length of said guide means and holding means positioned at the edges of said conveying means whereby fibrous material from said feed means is held by said holding means at the edge of said conveying means and is passed to the other edge of said conveying means and held by said holding means at said edge as the shorter belt passes along a straight flight of its path.

5. Apparatus for cross-laying fibrous materials comprising: a pair of endless belts of different lengths arranged so that the shorter belt is nested inside the longer belt, means for driving the longer belt which in turn drives the shorter belt, feed means attached to the shorter belt, a pair of guide means positioned in contact with the straight flights of said longer belt to control the path of said belts and the feed means attached thereto, a pair of substantially parallel endless conveyors positioned beneath and at an angle to said pair of endless belts, one conveyor being at one end of said guide means and the other conveyor at the other end of said guide means, and pins attached to the surfaces of said conveyors whereby fibrous material from said feed means is wrapped about a pin on one of said parallel conveyors, conveyed to a pin on the other parallel conveyor, wrapped about said pin and conveyed back to a subsequent pin on said first conveyor to be wrapped therearound as the shorter belt makes a complete path.

6. Apparatus for cross-laying fibrous materials comprising: a pair of endless belts of different lengths arranged so that the shorter belt is nested inside the longer belt, means for driving the longer belt which in turn drives the shorter belt, feed means attached to the shorter belt, a pair of guide means positioned in contact with the straight flights of said longer belt and at an angle to each other to control the path of said belts and the feed means attached thereto, a pair of substantially parallel endless conveyors positioned beneath and at an angle to said pair of endless belts, one conveyor being at one end of said guide means and the other conveyor at the other end of said guide means, and pins attached to the surfaces of said conveyors whereby fibrous material from said feed means is wrapped about a pin on one of said conveyors, conveyed to a pin on the other parallel conveyor, wrapped about said pin and conveyed back to a subsequent pin on said first conveyor to be wrapped therearound, as the shorter belt makes a complete path.

7. Apparatus for cross-laying fibrous materials comprising: a pair of endless belts of different lengths arranged so that the shorter belt is nested inside the longer belt, means for driving the longer belt which in turn drives the shorter belt, feed means attached to the shorter belt, a pair of guide means positioned in contact with the straight flights of said longer belt to control the path of said belts and the feed means attached thereto, a pair of substantially parallel endless conveyors positioned beneath and at an angle of approximately 90 degrees to said pair of endless belts, one conveyor being at one end of said guide means and the other conveyor at the other end of said guide means, and pins attached to the surfaces of said conveyors whereby fibrous material from said feed means is wrapped about a pin on one of said conveyors, conveyed to a pin on the other parallel conveyor, wrapped about said pin and conveyed back to a subsequent pin on said first conveyor to be wrapped there around as the shorter belt makes a complete path.

8. Apparatus for cross-laying fibrous materials comprising: a pair of endless belts of different lengths arranged so that the shorter belt is nested inside the longer belt, means for driving the longer belt which in turn drives the shorter belt, feed means attached to the shorter belt, a pair of guide means positioned in contact with the straight flights of said longer belt and at an angle to each other to control the path of said belts and the feed means attached thereto, a pair of substantially parallel endless conveyors positioned beneath and at an angle of approximately 90 degrees to said pair of endless belts, one conveyor being at one end of said guide means and the other conveyor at the other end of said guide means, and pins attached to the surfaces of said conveyors whereby fibrous material from said feed means is wrapped about a pin on one of said conveyors, conveyed to a pin on the other parallel conveyor, wrapped about said pin and conveyed back to a subsequent pin on said first conveyor to be wrapped there around as the shorter belt makes a complete path.

9. Apparatus for cross-laying fibrous materials comprising: a plurality of pairs of endless belts, one belt of a pair being longer than the other belt of said pair, arranged so that the shorter belt of each pair is nested inside the longer belt of each pair, means for driving the longer belt, which in turn drives the shorter belt, feed means attached to the shorter belt, each pair of belts having a pair of guide means positioned in contact with the straight flights of said longer belt to control the path of said belts and the feed means attached thereto, said pairs of belts being aligned with one flight of one pair adjacent and co-extensive with one flight of an adjacent pair, conveying means positioning beneath and at an angle to said plurality of pairs of endless belts, said conveying means being substantially as wide as the length of said guide means and holding means positioned at the edges of said conveying means whereby fibrous material from said feed means is held by said holding means at the edge of said conveying means and is passed to the other edge of said conveying means and held by said holding means at said edge as the shorter belts pass along a straight flight of their paths.

10. Apparatus for cross-laying fibrous materials comprising: a plurality of pairs of endless belts, one belt of a pair being longer than the other belt of said pair, arranged so that the shorter belt is nested inside the longer belt, means for driving the longer belt which in turn drives the shorter belt, feed means attached to the shorter belt, each pair of belts having a pair of guide means positioned in contact with the straight flights of said longer belt to control the path of said belts and the feed means attached thereto, said pairs of belts being aligned with one flight of one pair adjacent and co-extensive with one flight of an adjacent pair, conveying means positioned beneath and at an angle of approximately 90 degrees to said plurality of pairs of endless belts, said conveying means being substantially as wide as the length of said guide means and holding means positioned at the edges of said conveying means whereby fibrous material from said feed means is held by said holding means at the edge of said conveying means and is passed to the other edge of said conveying means and held by said holding means at said edge as the shorter belts pass along a straight flight of their paths.

11. Apparatus for cross-laying fibrous materials comprising: a plurality of pairs of endless belts, one belt of a pair being longer than the other belt of said pair, arranged so that the shorter belt is nested inside the longer belt, means for driving the longer belt which in turn drives the shorter belt, feed means attached to the shorter belt, each pair of belts having a pair of guide means positioned in contact with the straight flights of said longer belt and at an angle to each other to control the path of said belts and the feed means attached thereto, said pairs of belts being aligned with one flight of one pair adjacent and co-extensive with one flight on an adjacent pair and on substantially parallel center lines, conveying means positioned beneath and at an angle to said plurality of pairs of endless belts, said conveying means being substantially as wide as the length of said guide means and holding means positioned at the edges of said conveying means whereby fibrous material from said feed means is held by said holding means at the edge of said conveying means and is passed to the other edge of said conveying means and held by said holding means at said edge as the shorter belts pass along a straight flight of their paths.

References Cited

UNITED STATES PATENTS 2,962,080   11/1960   Hirsch _____ 156—440

EARL M. BERGERT, *Primary Examiner.*

J. P. MELOCHE, *Assistant Examiner.*